(12) United States Patent
Chen

(10) Patent No.: US 7,438,474 B2
(45) Date of Patent: Oct. 21, 2008

(54) SPACER STRUCTURE FOR CROSS ROLLERS

(75) Inventor: Yan-Yu Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 318 days.

(21) Appl. No.: 11/277,736

(22) Filed: Mar. 28, 2006

(65) Prior Publication Data

US 2007/0230837 A1  Oct. 4, 2007

(51) Int. Cl.
*F16C 19/40* (2006.01)

(52) U.S. Cl. .................. 384/51; 384/47; 384/551

(58) Field of Classification Search ............ 384/44, 384/47, 51, 447, 551, 623; 74/424.86, 424.88
See application file for complete search history.

(56) References Cited

U.S. PATENT DOCUMENTS

| | | | | |
|---|---|---|---|---|
| 2,294,665 A | * | 9/1942 | Jackson | 384/47 |
| 2,628,137 A | * | 2/1953 | Ashton | 384/447 |
| 4,687,345 A | * | 8/1987 | Geka | 384/44 |
| 5,597,243 A | * | 1/1997 | Kaiser et al. | 384/551 |
| 6,419,069 B1 | * | 7/2002 | Teramachi | 384/47 |
| 7,073,948 B2 | * | 7/2006 | Neder et al. | 384/447 |
| 2003/0138172 A1 | * | 7/2003 | Yabe et al. | 384/45 |

FOREIGN PATENT DOCUMENTS

DE           3609779 C1 *  1/1987

* cited by examiner

*Primary Examiner*—Thomas R Hannon
(74) *Attorney, Agent, or Firm*—Banger Shia

(57) ABSTRACT

A spacer structure for cross rollers comprises a frame and four protruding wings, the protruding wings are arranged in pairs on opposing sides of the frame and outwardly extend therefrom. The two inactive end surfaces of the roller are confined between the paired protruding wings of the spacer. The slenderness ratio of the roller is designed to be 0.7-0.98 for facilitating installation of the roller between the paired protruding wings of the spacer, and such arrangement can effectively reduce the contact area between the spacer and the roller. The paired opposite protruding wings can provide a stable positioning effect to the end surfaces of the roller.

10 Claims, 11 Drawing Sheets

SPACER STRUCTURE FOR CROSS ROLLERS

BACKGROUND OF THE INVENTION

1. Field of the Invention

The present invention relates to a spacer for a linear transmission apparatus, and more particularly to a spacer for cross rollers, which can make the roller move stably and can effectively reduce the contact area between the spacer and the roller, and also have a stable positioning function.

2. Description of the Prior Art

Since linear transmission products are being applied more and more widely in the modern industry, various linear transmission mechanisms have widely come into human life, manufacturing factory and high science and technology instruments, such as linear guideway, ball screw, and the like. Particularly in a large-scale precision mechanism are usually installed various large and small ball screws or linear guideway systems. Although the technology for linear transmission element is developing fast, consumers still need the technology to be improved uninterruptedly. Therefore, there are still some problems to be solved. And this desire for constant improvement of technology is particular strong in many high precision mechanism-manufacturing fields that require comparative stability and quiet. Hence, the existing linear mechanism still has some technological blind spots to be improved.

The spacer of the existing linear guideway has become the key research project of the related field, and since the spacer of the linear guideway is located between the rolling balls or the rollers, the spacer also is one of the key factors influencing the operation and the noise of the linear guideway. Therefore, the following different spacer products appear on the market:

As shown in FIG. 1, which shows spacers 11 used between the rollers 10, each of the spacers 11 has an arc contact surface for mating with the rollers 10, a chain 12 is arranged on a side of the respective spacers 11 for jointing the spacers together, and the spacers 11 prevent the generation of impact and noise between the rollers 10. However, this conventional spacer structure is impractical because of the following reasons:

First, the chain 12 on the side of the spacers 11 not only will probably affect the operation, but also will substantially increase the friction of the respective components.

Second, the conventional spacers 11 each has an arc contact surface for mating with the rollers 10, and the arc contact surface serves to contact the rolling surface 101 of the rollers 10, therefore, arc contact surface of the spacers 11 will produce an overlarge abrasion with respect to the rollers 10, adversely affecting the work efficiency of the linear system.

FIG. 2 shows another type spacer 14 used between rolling balls 13, the spacer 14 also has an arc contact surface 141 for contacting the rolling balls 13, and a chain 15 is arranged at a side of the respective spacers 14 for jointing them together. The spacers 14 prevent the generation of impact and noise between the rolling balls 13. However, this conventional spacer structure is also impractical because of the following reasons:

First, the chain 15 at the side of the spacers 14 not only will probably affect the operation, but also will substantially increase the friction of the respective components.

Second, this conventional spacer 14 has the arc contact surface 141 for contacting the rolling balls 13, therefore, arc contact surface of the spacer 14 will produce an overlarge abrasion with respect to the rolling balls 13, adversely affecting the work efficiency of the linear system.

Hence, with the popularization of the linear transmission application, the demand of solving the aforementioned problems is becoming more and more urgent, and manufacturing a spacer structure with less friction waste and high operation stability has become the most important selling point that the manufactures are striving for. Therefore, another spacer product was developed, as shown in FIG. 3, which is disclosed by U.S. Pat. No. 4,687,345.

This conventional spacer is used between cross rollers 16, and the spacer 17 is made by ejection molding and is arranged on the rolling surface 161 of the cross rollers 16. The spacer 17 has an arc-shaped contact surface 171 that can closely connect the rolling surface 161 of the cross rollers 16, hence, this conventional spacer structure can provide a stable positioning and anti-impact effect without the need of chain. However, it still has the following problems:

Due to the spacer 17 has an arc-shaped contact surface 171 that closely contacts the rolling surface 161 of the cross rollers 16, the friction waste caused by the arc-shaped contact surface 171 and the rolling surface 161 of the rollers 16 will be increased substantially. Although this spacer 17 maintains the operational stability, it will decrease the operation efficiency.

To solve the aforementioned problems, the inventor of this invention, on the basis of the accumulated experience and skills associated with the linear transmission field, develops a brand new spacer structure for cross rollers.

SUMMARY OF THE INVENTION

The primary objective of the present invention is to provide a spacer structure for cross rollers that can effectively reduce the friction waste.

The spacer comprises a frame and four protruding wings, the protruding wings are arranged in pairs on opposing sides of the frame and outwardly extend therefrom. The two inactive end surfaces of the roller are confined between the paired protruding wings of the spacer, so that the rolling surface of the roller will be free of surface-friction, effectively ensuring a smooth operation of the roller.

The secondary objective of the present invention is to provide a spacer structure for cross rollers that is more stable in the cross rolling direction.

The spacer is formed at two end surfaces thereof with protruding wings for positioning the roller, and the slenderness ratio of the roller is designed to be 0.7-0.98 for facilitating installation of the roller. Such arrangements ensure that the roller can move smoothly, and the protruding wings can provide a stable positioning effect.

Another objective of the present invention is to provide a spacer structure for cross rollers that allows a plurality of spacers to be jointed one another, forming a chain of spacers. The spacer is formed at two end surfaces thereof with protruding wings for positioning the roller, and the slenderness ratio of the roller is designed to be 0.7-0.98 for facilitating installation of the roller. Hence, the spacers can be jointed together or can be integrally formed as a unitary structure by using the protruding wings or the predetermined space.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
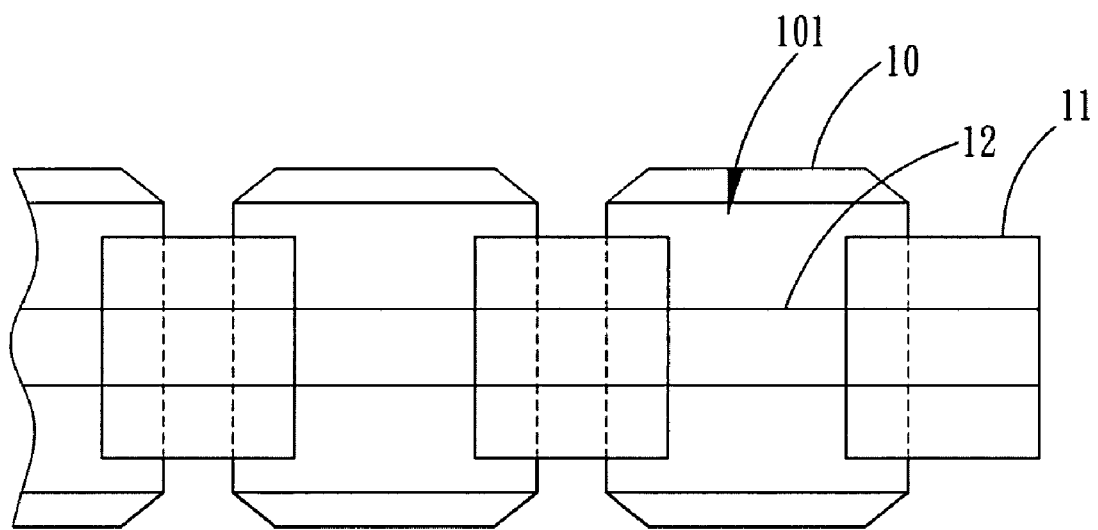
FIG. 1 is an illustrative view of a conventional spacer for a linear transmission apparatus.
Figure 2:
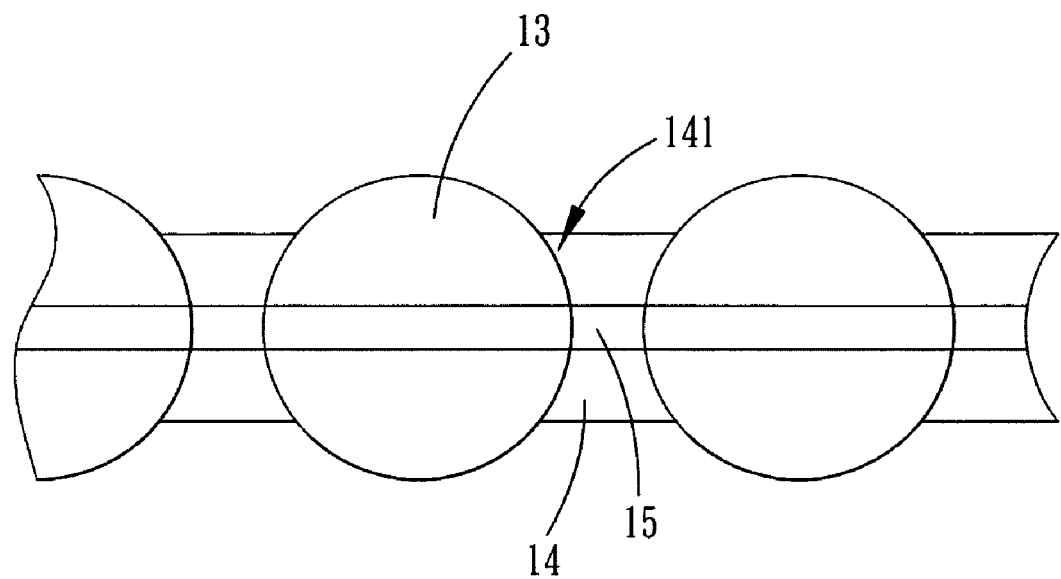
FIG. 2 is an illustrative view of another conventional spacer for a linear transmission apparatus.
Figure 3:
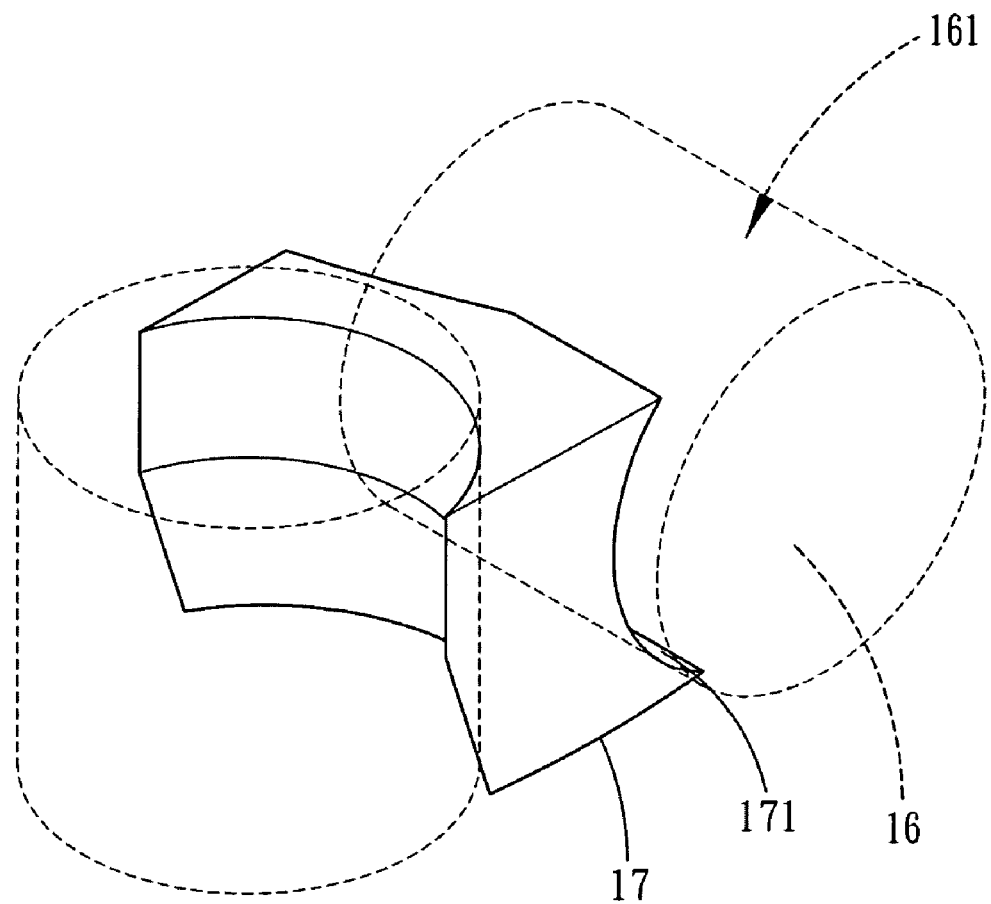
FIG. 3 is a perspective view of showing a spacer structure for cross rollers disclosed in U.S. Pat. No. 4,687,345.
Figure 4:
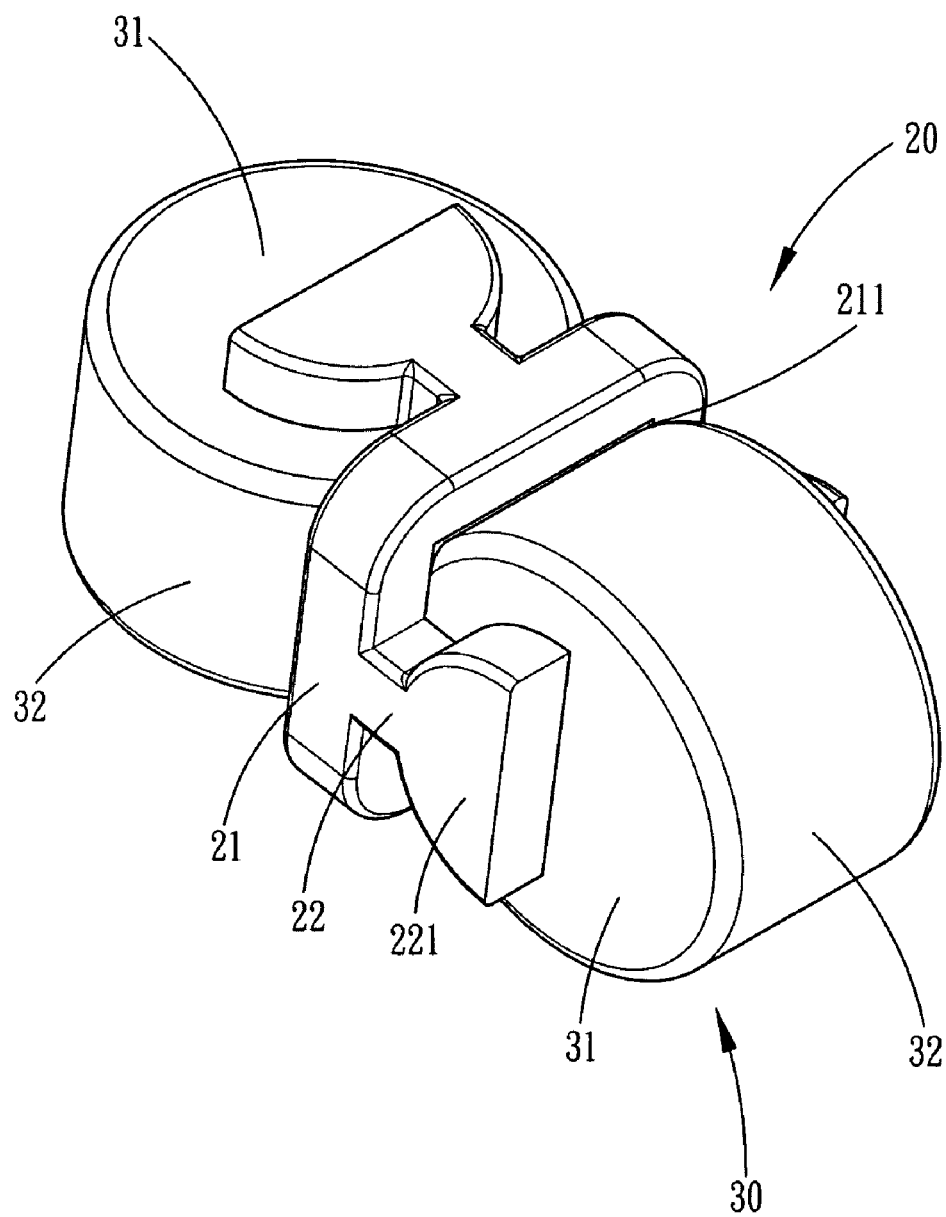
FIG. 4 is an illustrative view of a spacer structure for cross rollers in accordance with a first embodiment of the present invention.
Figure 5:
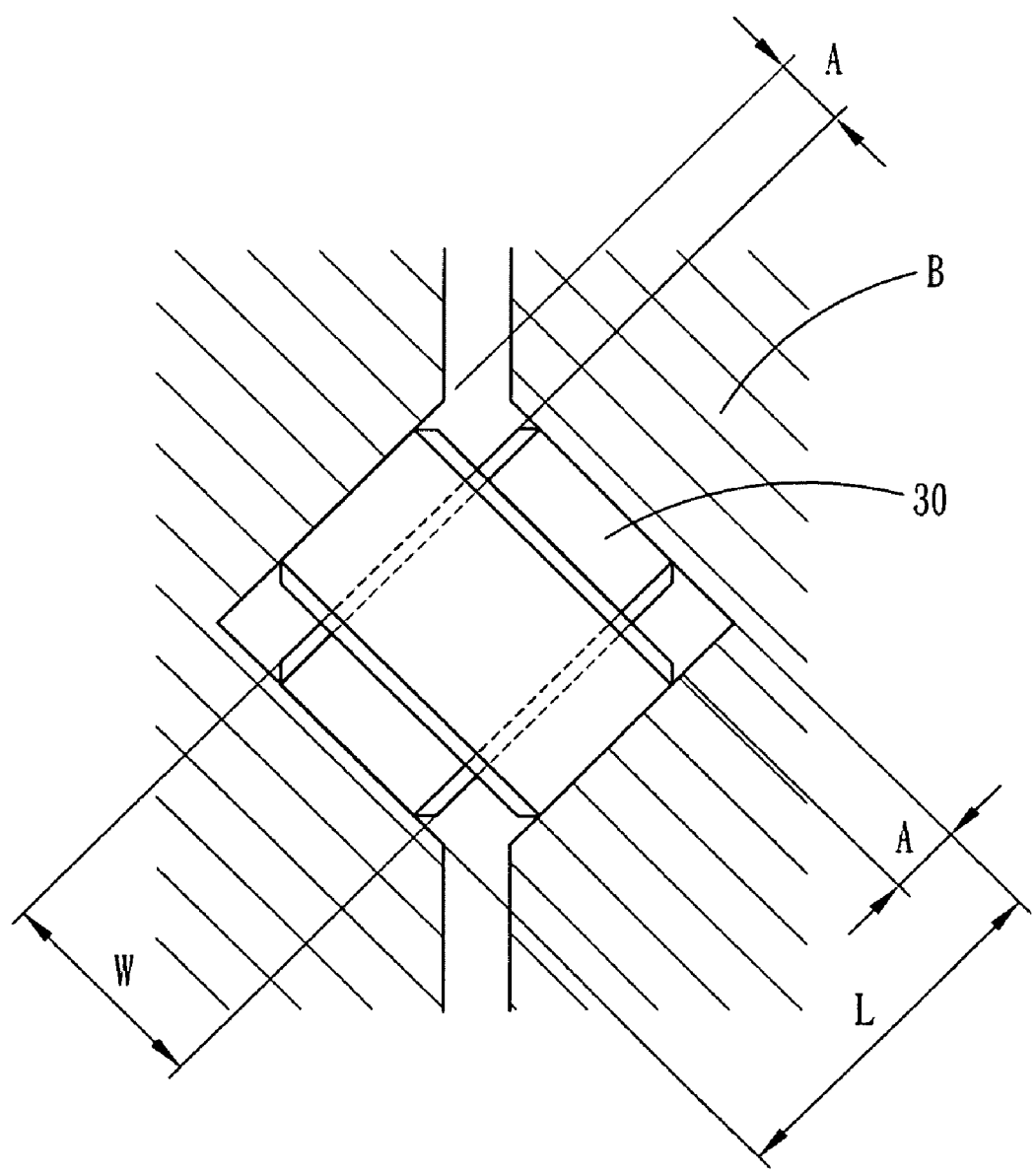
FIG. 5 is an illustrative view of showing a cross roller in accordance with the present invention.
Figure 6:
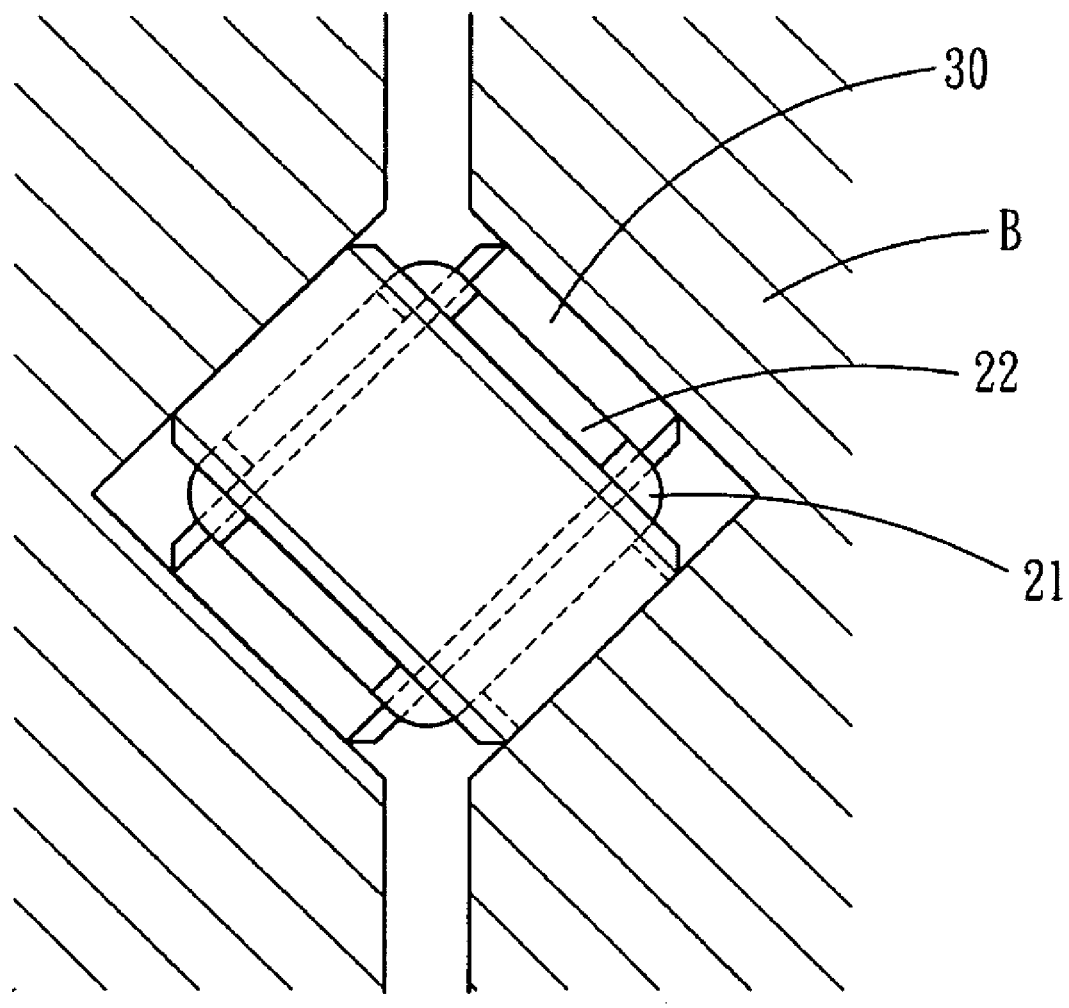
FIG. 6 is an illustrative view of showing a cross roller and a spacer in accordance with the first embodiment of the present invention.

The foregoing, and additional objects, features and advantages of the present invention will become apparent from the following detailed description of first preferred embodiment thereof, taken in conjunction with the accompanying FIGS. 4-6.

The spacer 20 in accordance with the present invention is used in a bearing apparatus B of a ball screw or a linear guideway that uses cross roller 30, and this spacer 20 is characterized in that:

The spacer 20 is made of elastic material and comprises a frame 21 and four protruding wings 22. The frame 21 is formed with a space 211. The protruding wings 22 are arranged in pairs on opposing sides of the frame 21 and outwardly extend therefrom, and a semi-circular stopping portion 221 is formed at the end of the respective protruding wings 22.

The roller 30 has two inactive end surfaces 31 and a rolling surface 32. The two inactive end surfaces 31 of the roller 30 are confined between the paired protruding wings 22 of the spacer 20. The slenderness ratio of the roller 30 is designed to be 0.7-0.98 for easy installation between the paired protruding wings 22 of the spacer 20, thus generating a receiving clearance A. The space 211 of the spacer 20 enables the rolling surface 32 to be in a linear contact with the frame 21. The slenderness ratio of the roller 30 means the ratio of the roller length L to its width W.

Figure 9:
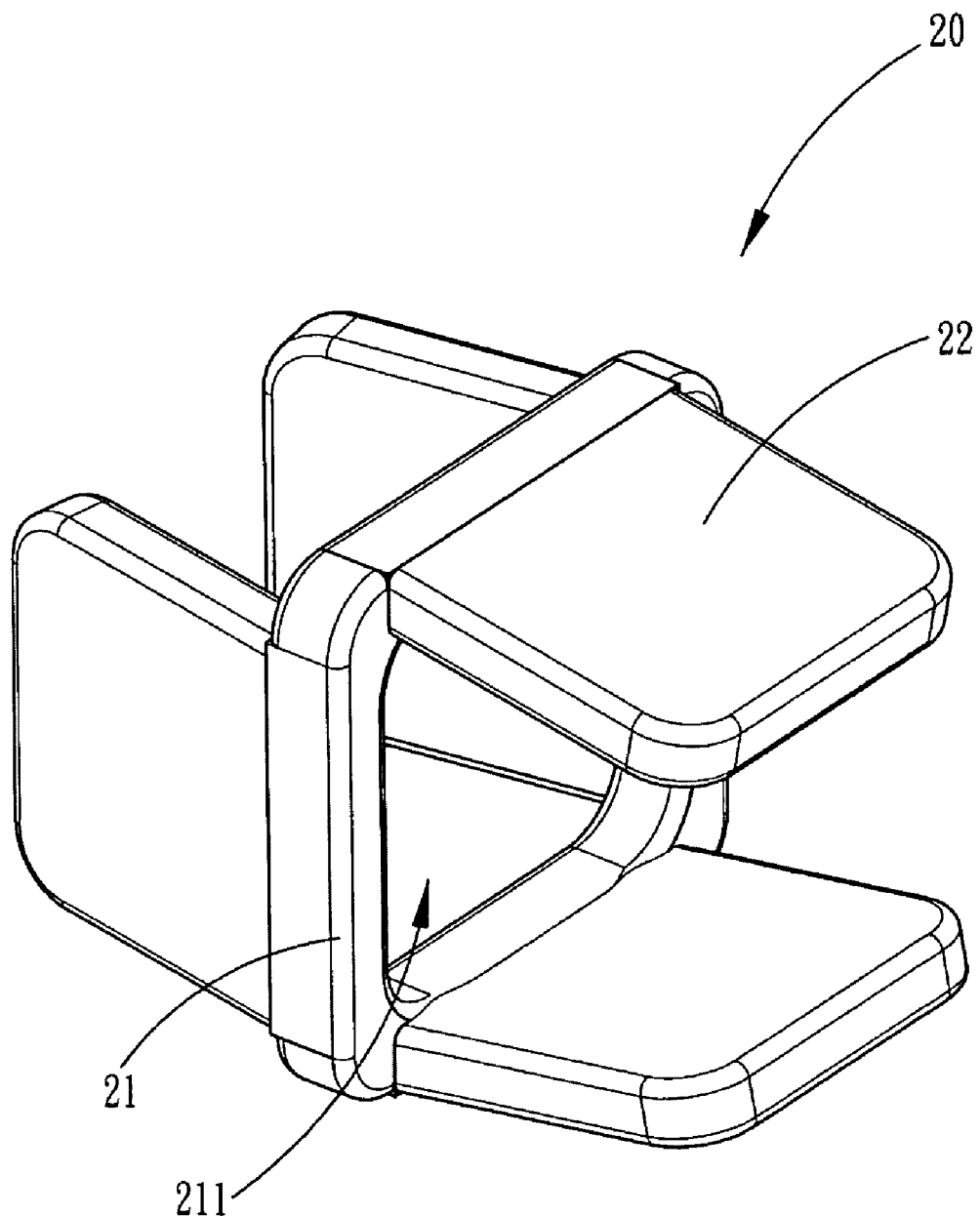
FIG. 9 is a perspective view of a spacer structure for cross rollers in accordance with a fourth embodiment of the present invention.
Figure 11:
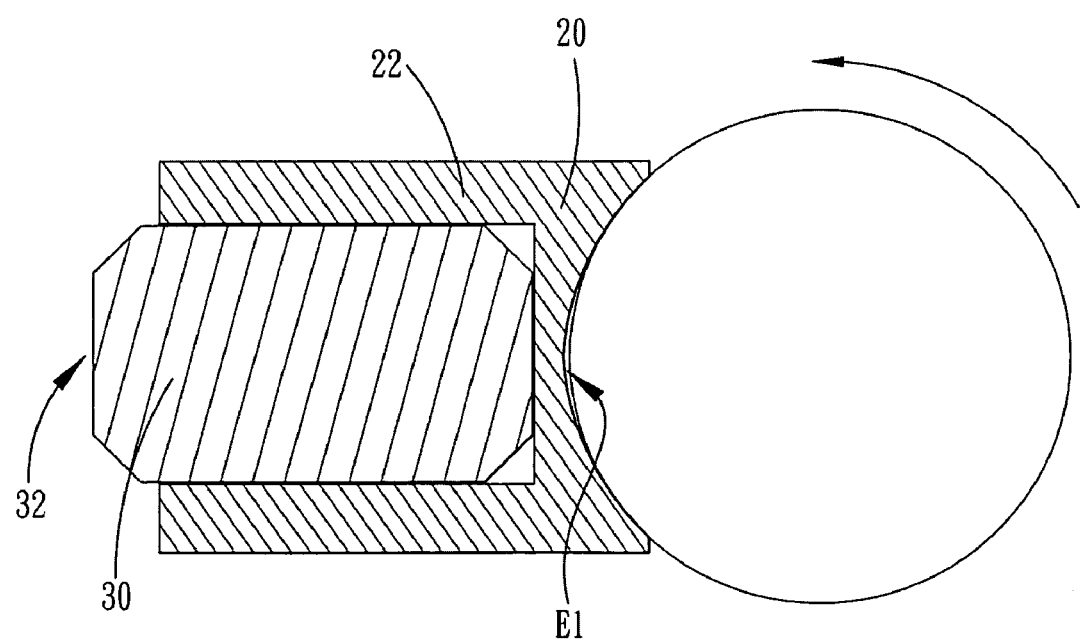
FIG. 11 is a cross sectional view of showing a spacer and a roller in accordance with a fifth embodiment of the present invention.

The space 211 of the frame 21 of the spacer 20 can take the form of a central hole (as shown in the embodiments of FIGS. 4 and 9) or Gothic groove (as shown in FIG. 11) as long as it can enable the rolling surface 32 to have a linear contact with the frame 21. Any other forms of products that have a space and can ensure a linear contact would be considered within the scope of the present invention.

For a better understanding of the first embodiment, its operation and function, reference should be made to the detailed decryptions below, taken in conjunction with the accompanying FIGS. 4-6.

Due to the space 211 is formed in the frame 21 of the spacer 20 for ensuring a linear contact between the rolling surface 32 of the roller 30 and the frame 21, plus the protruding wings 22 are arranged in pairs on opposing sides of the frame 21 and outwardly extend therefrom (the semi-circular stopping portion 221 is formed at the end of the respective protruding wings 22), and the two inactive end surfaces 31 of the roller 30 are confined between the paired protruding wings 22 of the spacer 20, and the slenderness ratio of the roller 30 is designed to be 0.7-0.98, it can produce the receiving clearance A for accommodation of the stopping portion 221 of the respective protruding wings 22. Hence, the combination of the above-mentioned arrangements can prevent an overlarge friction between the rolling surface 32 of the roller 30 and the spacer 20, improving the rolling efficiency of the rolling surface 32 of the roller 30 and the bearing apparatus B. Furthermore, the protruding wings 22 of the spacer 20 can position the two inactive end surfaces 31 of the roller 30, ensuring that the roller 30 rolls stably at high speed.

Figure 7:
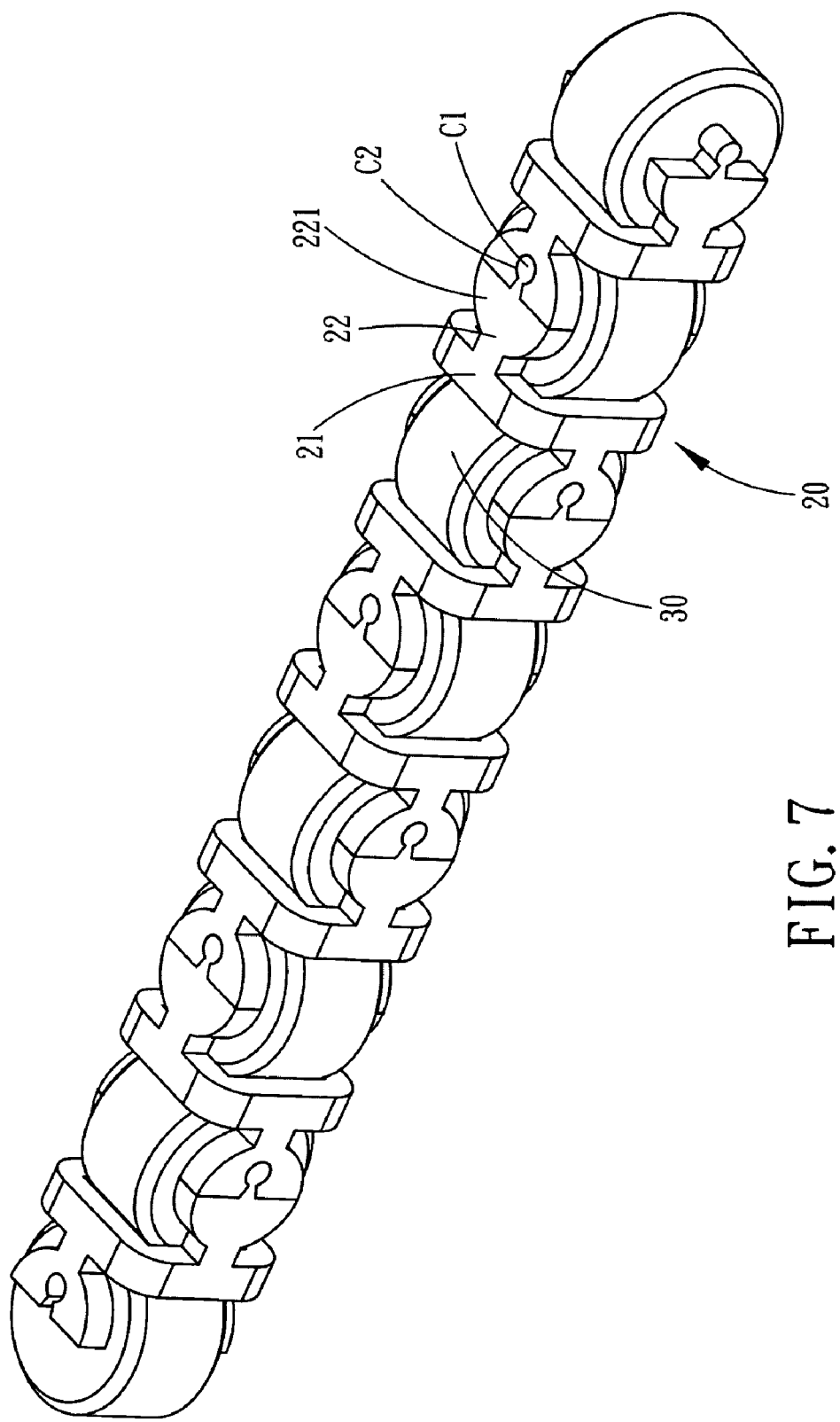
FIG. 7 is an operational view of showing a spacer structure for cross rollers in accordance with a second embodiment of the present invention.

Referring to a second embodiment as shown in FIG. 7, the stopping portion 221 of the protruding wings 22 of the spacer 20 of the first embodiment still can be used in this second embodiment, and the protruding wings 22 at opposite sides of the spacer 20 are formed with an engaging protrusion C1 or an engaging concave C2, respectively, so that the spacers 20 can be jointed to one another through the engagement of the engaging protrusion C1 in the engaging concave C2, forming a chain of spacers 20. By such arraignments, the present invention not only can ensure a required rolling efficiency of the roller 30, but also the connection and engagement of the protruding wings 22 of the spacers 20 can reinforce the operation stability. Therefore, the present invention is really a spacer structure for cross rollers that is more stable and less susceptible to disengagement and interference, and the bearing apparatus B needn't to be disassembled frequently for maintenance.

Figure 8:
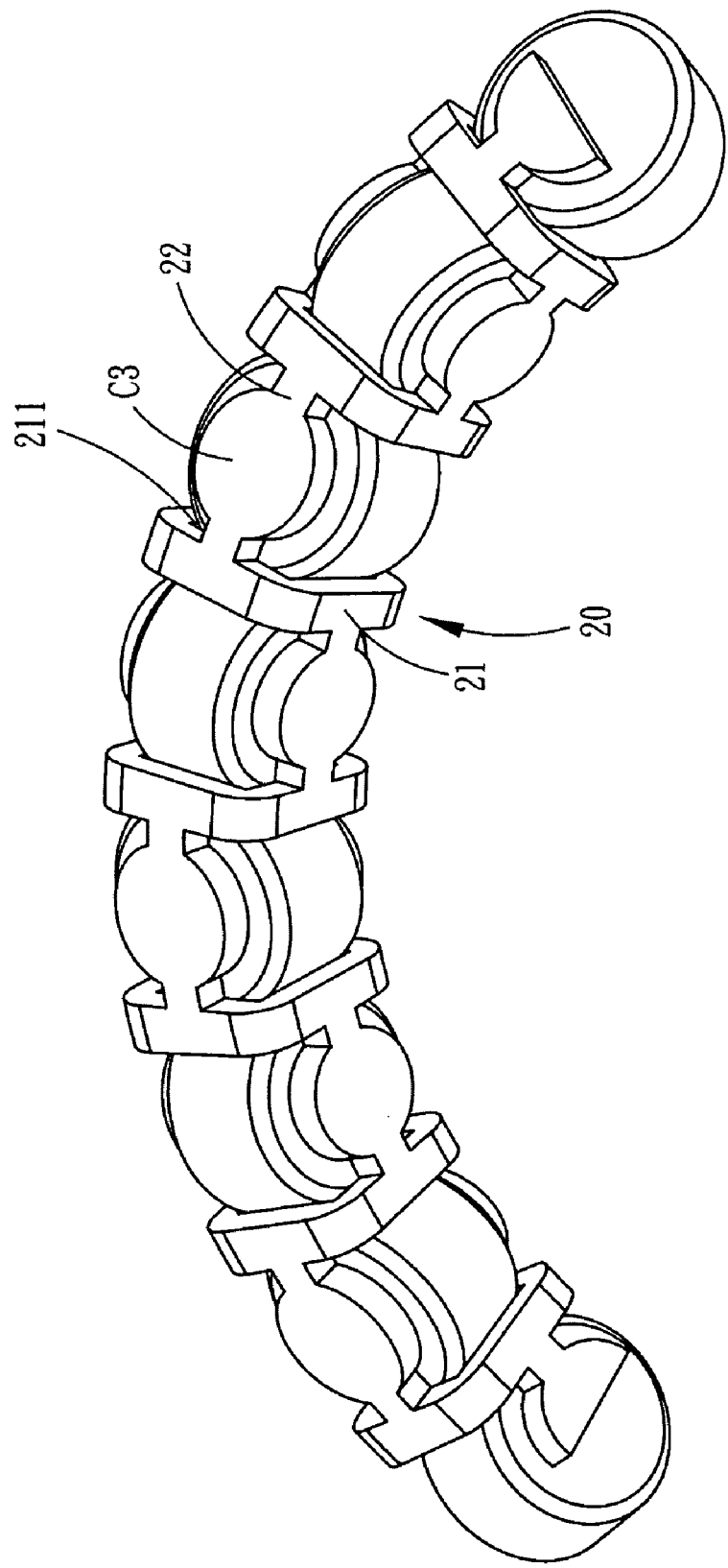
FIG. 8 is an operational view of showing a spacer structure for cross rollers in accordance with a third embodiment of the present invention.

Referring then to FIG. 8, which is a third embodiment of the present invention, this embodiment will use the same design as the second embodiment that the circular stopping portions C3 of the protruding wings 22 of the spacer 20 are integrally formed together. Each spacer 20 still comprises a frame 21 and four wings 22. A space 211 is formed in the frame 21, the protruding wings 22 are arranged in pairs on opposing sides of the frame 21 and outwardly extend therefrom, and formed in the end of the protruding wings 22 is the circular stopping portion C3 commonly used by two spacers 20. This embodiment has the same function as the second embodiment, but is more convenient to assemble and produce.

Figure 10:
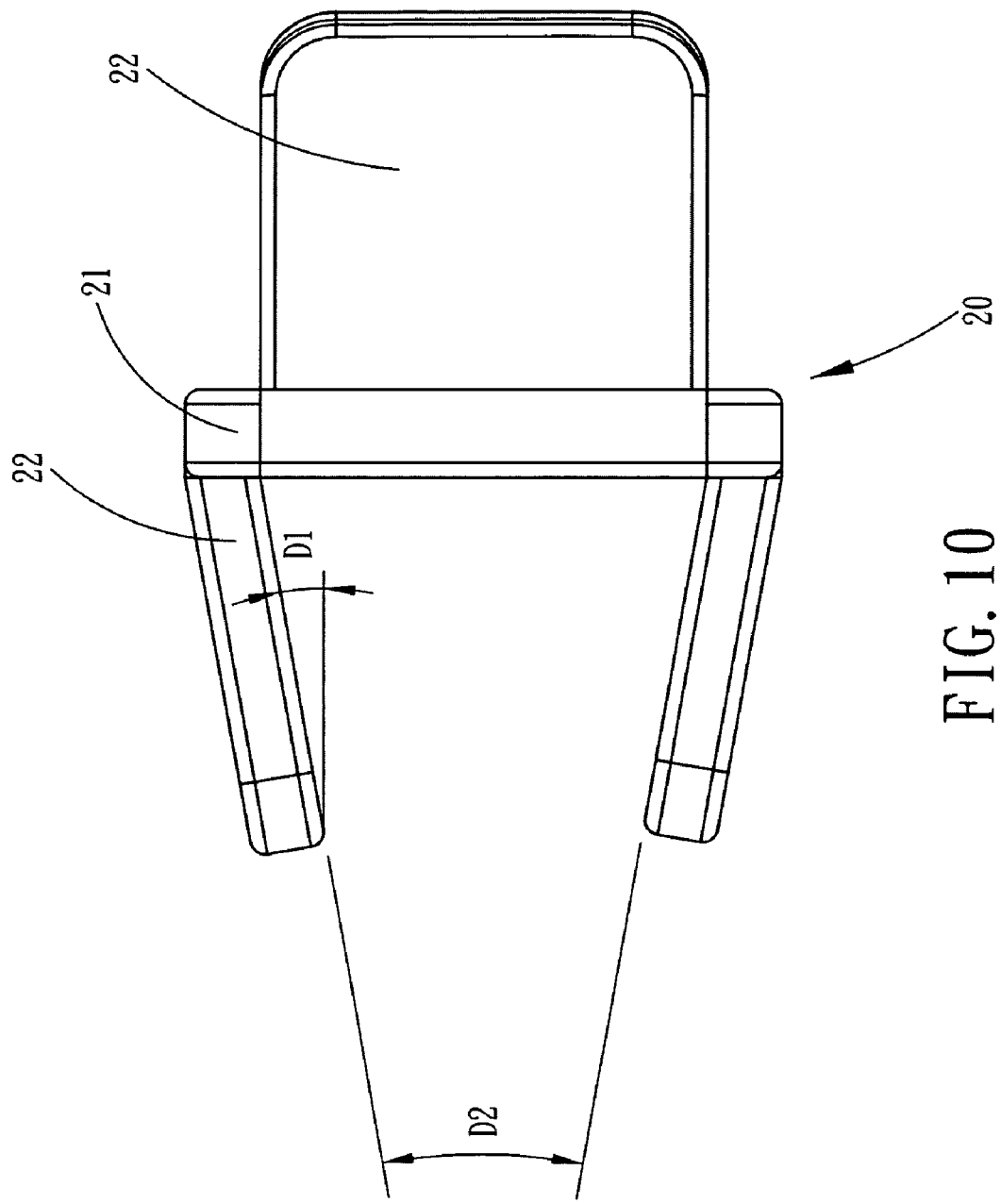
FIG. 10 is a side view of the spacer structure for cross rollers in accordance with the fourth embodiment of the present invention.

Referring then to a fourth embodiment as shown in FIGS. 9 and 10.

The spacer 20 is made of elastic material and comprises a frame 21 and four protruding wings 22. The frame 21 is formed with a space 211. The protruding wings 22 are arranged in pairs on opposing sides of the frame 21 and outwardly extend therefrom, and the respective oppositely arranged protruding wings 22 are inclined a predetermined angle D1 toward each other, so that the ends of the paired opposite protruding wings 22 taper to form a minimum distance D2, and the minimum distance D2 is smaller than or equal to the distance between the two end surfaces of the roller.

The design concept of the fourth embodiment is quiet opposite to that of the previous embodiments, the fourth embodiment is aimed at reducing the friction effect of the protruding wings 22 of the spacer 20. Since the respective oppositely arranged protruding wings 22 are inclined a predetermined angle D1 toward each other, and the minimum distance D2 is smaller than or equal to the distance between the two end surfaces of the roller, such arrangements can ensure that the protruding wings 22 of the spacer 20 only keeps in a linear contact with the roller, thus reducing the friction during operation.

Referring finally to FIG. 11, which shows a fifth embodiment of the present invention, the space of the frame 21 of the spacer 20 can be in the form of a Gothic type groove El, thus ensuring that the rolling surface 32 of the roller 30 keeps in a linear contact with the frame 21.

The present invention is applicable to various cross-roller type linear transmission apparatuses, including linear guideway, ball screw, and any other linear transmission apparatus with cross roller would be considered within the scope of the present invention.

To summarize, the innovated design of the present invention is characterized in that the spacer comprises a frame and four protruding wings, the protruding wings are arranged in pairs on opposing sides of the frame and outwardly extend therefrom. The two inactive end surfaces of the roller are confined between the paired protruding wings of the spacer. The slenderness ratio of the roller is designed to be 0.7-0.98 for facilitating installation of the roller between the paired protruding wings of the spacer, and such arrangement can effectively reduce the contact area between the spacer and the roller. The paired opposite protruding wings can provide a stable positioning effect to the end surfaces of the roller.

While we have shown and described various embodiments in accordance with the present invention, it should be clear to those skilled in the art that further embodiments may be made without departing from the scope of the present invention.

What is claimed is:

1. A spacer structure for cross rollers being disposed between cross rollers of a linear transmission apparatus, wherein:

the spacer is made of elastic material and comprises a frame and a plurality of protruding wings integrally formed on the frame, the frame is formed with a spacer, the protruding wings are arranged in pairs on opposing sides of the frame and outwardly extend therefrom; and the rollers each has two inactive end surfaces and a rolling surface, the two inactive end surfaces of the rollers are confined each paired protruding wings, and a space of the spacer enables the rolling surface to have a linear contact with the frame of the spacer;

wherein the space of the frame of the spacer is a Gothic type groove.

2. The spacer structure for cross rollers as claimed in claim 1, wherein a semi-circular stopping portion is formed at an end of the respective protruding wings.

3. The spacer structure for cross rollers as claimed in claim 1, wherein the protruding wings at the opposite sides of the spacer are formed with an engaging protrusion or an engaging concave, so that a plurality of spacers can be jointed to one another through engagement of the engaging protrusion in the engaging concave.

4. The spacer structure for cross rollers as claimed in claim 1, wherein a circular stopping portion is integrally formed in an end of the protruding wings and commonly used by two spacers.

5. The spacer structure for cross rollers as claimed in claim 1, wherein the respective oppositely arranged protruding wings are inclined a predetermined angle toward each other, so that the ends of the paired opposite protruding wings taper to form a minimum distance, and the minimum distance is smaller than or equal to a distance between the two end surfaces of the roller.

6. The spacer structure for cross rollers as claimed in claim 1, wherein a slenderness ratio of the roller is designed to be 0.7-0.98, thus generating a receiving clearance for accommodation of the protruding wings.

7. The spacer structure for cross rollers as claimed in claim 6, wherein a semi-circular stopping portion is formed at an end of the respective protruding wings.

8. The spacer structure for cross rollers as claimed in claim 6, wherein the protruding wings at the opposite sides of the spacer are formed with an engaging protrusion or an engaging concave, so that a plurality of spacers can be jointed to one another through engagement of the engaging protrusion in the engaging concave.

9. The spacer structure for cross rollers as claimed in claim 6, wherein a circular stopping portion is integrally formed in an end of the protruding wings and commonly used by two spacers.

10. The spacer structure for cross rollers as claimed in claim 6, wherein the respective oppositely arranged protruding wings are inclined a predetermined angle toward each other, so that the ends of the paired opposite protruding wings taper to form a minimum distance, and the minimum distance is smaller than or equal to a distance between the two end surfaces of the roller.

* * * * *